(12) United States Patent
Guidotti et al.

(10) Patent No.: US 10,113,012 B2
(45) Date of Patent: Oct. 30, 2018

(54) CATALYST COMPONENTS FOR THE POLYMERIZATION OF OLEFINS

(71) Applicant: BASELL POLIOLEFINE ITALIA S.R.L., Milan (IT)

(72) Inventors: Simona Guidotti, Ferrara (IT); Tiziano Dall'Occo, Ferrara (IT); Dario Liguori, Ferrara (IT); Giampiero Morini, Ferrara (IT); Fabrizio Piemontesi, Ferrara (IT); Gianni Vitale, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 159 days.

(21) Appl. No.: 15/123,108

(22) PCT Filed: Mar. 10, 2015

(86) PCT No.: PCT/EP2015/054900
§ 371 (c)(1),
(2) Date: Sep. 1, 2016

(87) PCT Pub. No.: WO2015/135903
PCT Pub. Date: Sep. 17, 2015

(65) Prior Publication Data
US 2017/0066851 A1    Mar. 9, 2017

(30) Foreign Application Priority Data

Mar. 14, 2014   (EP) .................................... 14159900

(51) Int. Cl.
| | | |
|---|---|---|
| *C08F 4/64* | (2006.01) | |
| *C08F 4/12* | (2006.01) | |
| *C08F 10/02* | (2006.01) | |
| *C08F 10/06* | (2006.01) | |

(52) U.S. Cl.
CPC .................. *C08F 4/64* (2013.01); *C08F 4/12* (2013.01); *C08F 10/02* (2013.01); *C08F 10/06* (2013.01)

(58) Field of Classification Search
CPC .. C08F 10/02; C08F 10/06; C08F 4/12; C08F 4/64

USPC ....................................................... 526/124.3
See application file for complete search history.

(56) References Cited

U.S. PATENT DOCUMENTS

| | | | |
|---|---|---|---|
| 4,237,254 A | * | 12/1980 | Kitagawa ................ C08F 10/00 502/112 |
| 4,315,088 A | | 2/1982 | Kitagawa et al. |
| 6,617,278 B1 | | 9/2003 | Jin et al. |
| 2006/0025300 A1 | | 2/2006 | Diego et al. |
| 2006/0089251 A1 | | 4/2006 | Brita et al. |
| 2013/0274428 A1 | | 10/2013 | Collina et al. |

FOREIGN PATENT DOCUMENTS

| | | | | |
|---|---|---|---|---|
| CN | 1229092 A | | 9/1999 | |
| CN | 102453181 A | | 5/2012 | |
| CN | 103270056 A | * | 8/2013 | .............. C08F 10/00 |
| DE | 2818642 A1 | | 11/1978 | |
| JP | S5490382 A | | 7/1979 | |
| JP | 2014504327 A | | 2/2014 | |
| JP | 5490382 B2 | * | 5/2014 | |
| RU | 2322457 C2 | | 4/2008 | |
| WO | WO-9948929 A1 | | 9/1999 | |
| WO | WO-2012041944 A1 | | 4/2012 | |

OTHER PUBLICATIONS

CN-103270056-A—machine translation—Pub Aug. 28, 2013.*
PCT International Search Report and Written Opinion dated Jun. 18, 2015 (Jun. 18, 2015) for Corresponding PCT/EP2015/054900.

* cited by examiner

*Primary Examiner* — Ling Siu Choi
*Assistant Examiner* — Ronald Grinsted

(57) ABSTRACT

The present disclosure relates to a solid catalyst component for the (co)polymerization of olefins $CH_2=CHR$, in which R is hydrogen or a hydrocarbyl radical with 1-12 carbon atoms, comprising Ti, Mg, and Cl, and optionally an electron donor compound selected from the group consisting of ethers, amines, silanes, carbamates ketones, esters of aliphatic acids, alkyl and aryl esters of optionally substituted aromatic polycarboxylic acids, diol derivatives chosen among monoesters monocarbamates and monoesters monocarbonates or mixtures thereof, comprising from 0.1 to 50% wt of Bi with respect to the total weight of the solid catalyst component.

15 Claims, 1 Drawing Sheet

Clean Version - Specification
Xylene soluble fraction as a function of ethylene content for the copolymers from Ex. 25 to Ex. 29 (with C donor ).
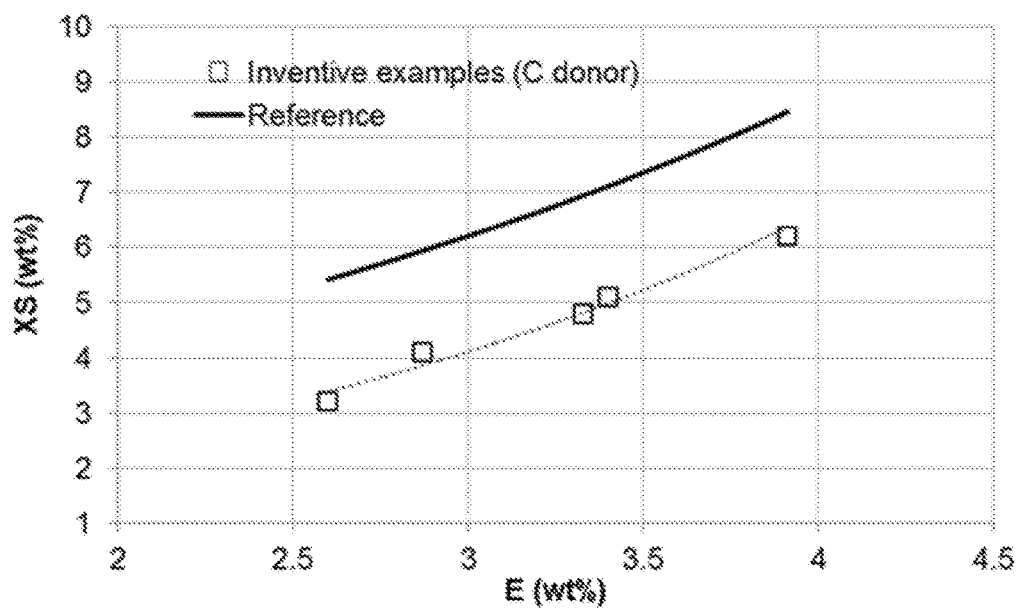

CATALYST COMPONENTS FOR THE POLYMERIZATION OF OLEFINS

This application is the U.S. National Phase of PCT International Application PCT/EP2015/054900, filed Mar. 10, 2015, claiming benefit of priority to European Patent Application No. 14159900.1, filed Mar. 14, 2014, the contents of which are incorporated herein by reference in its entirety.

FIELD OF THE INVENTION

The present disclosure relates to catalyst components for the (co)polymerization of olefins, such as propylene, comprising Mg, Bi, Ti and halogen elements and optionally at least one electron donor compound. The present disclosure further relates to the catalysts obtained from said components and to their use in processes for the (co)polymerization of olefins such as propylene.

BACKGROUND OF THE INVENTION

Catalyst components for the polymerization of olefins, such as ethylene and propylene, are widely known in the art and include Ziegler-Natta (Z-N) type catalysts. The first catalyst of this type widely used in the industry was based on the use of solid $TiCl_3$ obtained by the reduction of $TiCl_4$ with aluminum alkyls. The activity and stereospecificity of early Z-N catalysts were not ideal so the polymer had to undergo a de-ashing treatment to remove the catalyst residues, and a washing step for removing the atactic polymer (polypropylene) produced. Ziegler-Natta catalysts used industrially often comprise a solid catalyst component, constituted by a magnesium dihalide on which a titanium compound and optionally an internal electron donor compound, used in combination with an Al-alkyl compound, are supported.

The use of magnesium chloride based supports led to increases in the catalyst activity and to the development of various techniques for their production. For instance, in ethylene polymerization, catalyst activity is important. In U.S. Pat. No. 4,330,646, an organomagnesium hydrocarbon soluble component is reacted with an halide of boron, silicon, germanium, tin, phosphorous, antimony bismuth or zinc to produce magnesium chloride, which is then subject to a titanation reaction. There is no evidence that the metal of the halogenating compound in this process remains fixed on the catalyst support at the end of the preparation process. However, in terms of catalyst activity, the use of $SbCl_3$ and $Sb(C_2H_5)_3Cl_2$ as a halogenating agent (please see Examples 4 and 25) may generate a less active catalyst in an ethylene polymerization carried out with the catalyst lacking an internal donor. It would therefore be beneficial to develop a catalyst with increased catalyst activity in ethylene polymerization.

When Z-N catalysts are used for propylene polymerization, they may contain an internal donor. Moreover, they may be used together with an external donor (for example, an alkoxysilane) which may produce higher isotacticity. Internal donors may include the esters of phthalic acid, such as diisobutylphthalate. Phthalates are often used as internal donors in combination with alkylalkoxysilanes as external donors. This catalyst system is capable of good performance in terms of activity, and can produce propylene polymers with high isotacticity and xylene insolubility. However, increasing the intrinsic capability of the solid catalyst components, including those based on donors different from phthalates, to produce stereoregular polymers would be beneficial in propylene polymerization. In fact, an intrinsically more stereospecific catalyst component would allow the use of a lower amount of stereoregulating internal and/or external donor to reach the target of polymer xylene insolubility and this, in turn, would be translated into the possibility of obtaining higher plant productivity.

Based on this, it would be very convenient to find a way of improving the stereospecificity of a solid catalyst component, and it would be convenient if this method had wide applicability.

U.S. Pat. No. 4,237,254 discloses catalyst preparation methods in which a magnesium hydroxychloride support is converted into a magnesium chloride based catalyst by reacting it with halogenating agents such as benzoylchloride. The support is then co-milled with a benzoate as internal donor and treated with $TiCl_4$. Further treatment of the catalyst with an additional halogenating agent such as $BiCl_3$ may also be useful. However, the use of the additional chlorinating agents helps in terms of stereospecificity in connection with the use of benzoates as internal donors was not investigated. The applicant demonstrated, however, that the use of $BiCl_3$ in the catalyst along with benzoates as internal donors offered no improvement in activity/stereospecificity.

U.S. Pat. App. Pub. No. 2013/0244863 describes a catalyst preparation in which a Mg complex containing an acid salt of a Group IB-VIIIB element (CAS version of the periodic table of elements) and an internal donor is contacted with a titanium compound to produce a catalyst component to be used in a catalyst system comprising an aluminum compound co-catalyst and a silicon compound as an external donor. Notwithstanding the vast number of compounds included in a potential acid salt of a Group IB-VIIIB element, only few salts were tested (Table 1), none of them belonging to Group VA of the Periodic Table of Elements. In addition, the results are contradictory in many cases. For instance, Table 2 (a catalyst containing phthalate as an internal donor) shows that the comparative catalyst not containing the Group IB-VIIIB salt has activity and stereospecificity higher than that of many (1-4, 6-11, 13-15 and 17-19) of the inventive examples disclosed therein. When a diether is used as an internal donor a substantial increase of stereospecificity is generally seen only with $CuCl_2$ and $PdCl_2$. Due to the fact that in Table 1 of the referenced application the performance of catalyst including $ZnCl_2$ is very low, it seems that, in going from Group IB to Group IIB, the performances are deteriorating.

The applicants have surprisingly found that, when the disclosed catalyst contains a certain amount of bismuth (Bi) atoms, improvement in activity and/or stereospecificity is obtained in polymerizing olefins such as ethylene or propylene.

SUMMARY OF THE INVENTION

The present disclosure generally relates to a solid catalyst component comprising Ti, Mg, Cl, and, optionally, an electron donor compound selected from the group consisting of ethers, amines, silanes, carbamates ketones, esters of aliphatic acids, alkyl and aryl esters of optionally substituted aromatic polycarboxylic acids, diol derivatives chosen among monoesters monocarbamates and monoesters monocarbonates or mixtures thereof, wherein the solid catalyst component contains from 0.1 to 50% wt. of Bi with respect to the total weight of said solid catalyst component.

BRIEF DESCRIPTION OF THE DRAWINGS

FIG. 1 shows a xylene soluble fraction as a function of ethylene content for certain copolymers of the present disclosure.

DETAILED DESCRIPTION OF THE INVENTION

In some embodiments, in the catalyst component of the present disclosure the content of Bi ranges from 0.5 to 40%, such as from 0.5 to 35%, and from 0.5 to 20% or from 1 to 20% (all percentages by weight). In another embodiment, the content of Bi ranges from 1 to 35%, including from 2 to 25% by wt. and from 2 to 20% by wt.

The particles of the solid catalyst component generally comprise a spherical morphology and an average diameter ranging between 5 and 150 µm, such as from 20 to 100 µm and from 30 to 90 µm. A "substantially spherical morphology" means the ratio between the greater axis and the smaller axis is equal to or lower than 1.5, including lower than 1.3.

The amount of Mg, in some embodiments, ranges from 8 to 30%, such as from 10 to 25% by wt. with respect to the total weight of the solid catalyst component.

In certain embodiments, the amount of Ti can range from 0.5 to 5%, such as from 0.7 to 3% by wt., with respect to the total weight of the solid catalyst component.

It has been observed that the amount of Ti may become lower as the amount of Bi increases. As a result, in some embodiments the Mg/Ti molar ratio is higher than the corresponding ratio of the catalyst not containing Bi.

The titanium atoms may be derived from titanium compounds of the general formula $Ti(OR)_nX_{4-n}$, in which n is between 0 and 4; X is a halogen and R is a hydrocarbon radical, such as an alkyl group radical having 1-10 carbon atoms, or a COR group. In some embodiments, the titanium compounds have at least one Ti-halogen bond such as titanium tetrahalides or halogenalcoholates. In certain embodiments, the titanium compounds are $TiCl_4$, and $Ti(OEt)Cl_3$. In certain embodiments such as certain ethylene polymerization processes, the catalyst may not contain an electron donor.

When an increased stereospecificity is desired, the internal electron donor may be present in the catalyst component and selected from group consisting of ethers, amines, silanes, carbamates ketones, esters of aliphatic acids, alkyl and aryl esters of optionally substituted aromatic polycarboxylic acids, diol derivatives chosen among monoesters monocarbamates, monoesters, monocarbonates or mixtures thereof.

When the internal donor is selected from alkyl and aryl esters of substituted aromatic polycarboxylic acids, in some embodiments the donors are esters of phthalic acids. In certain embodiments, esters of aliphatic acids are selected from malonic, glutaric, maleic and succinic acids. Examples of such esters are n-butylphthalate, di-isobutylphthalate, and di-n-octylphthalate.

In further embodiments, the ethers can be selected from 1,3 diethers of the general formula:

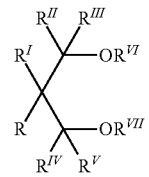

(I)

wherein R, $R^I$, $R^{II}$, $R^{III}$, $R^{IV}$ and $R^V$ are equal or different to each other and comprise hydrogen or hydrocarbon radicals having from 1 to 18 carbon atoms, and $R^{VI}$ and $R^{VII}$, equal or different from each other, have the same meaning of R-$R^V$ except that they cannot be hydrogen; and one or more of the R-$R^{VII}$ groups can be linked to form a cycle. In some embodiments, the 1,3-diethers are those in which $R^{VI}$ and $R^{VII}$ are selected from $C_1$-$C_4$ alkyl radicals.

It is also possible to use mixtures of the above mentioned donors. Specific mixtures are those constituted by esters of succinic acids and 1,3 diethers as disclosed in WO2011/061134.

When it is desired to increase the capability of the catalyst to distribute an olefin co-monomer within a polymer chain, such as in the production of ethylene/α-olefin copolymers, the electron donor may be selected from among monofunctional donors, including ethers and $C_1$-$C_4$ alkyl esters of aliphatic mono carboxylic acids. In further embodiments, ethers may be $C_2$-$C_{20}$ aliphatic ethers including cyclic ethers having 3-5 carbon atoms cyclic ethers such as tetrahydrofurane, dioxane. In additional embodiments, esters are ethylacetate and methyl formate. Among them tetrahydrofuran and ethyl acetate may be used.

In general, the final amount of electron donor compound in the solid catalyst component may range from 0.5 to 40% by weight, including in the range from 1 to 35% by weight.

It has been observed that the Mg/donor molar ratio may be influenced by the presence of Bi and is generally higher than the corresponding ratio for catalysts not containing Bi.

In certain embodiments, the donor is an alkyl and aryl ester of an optionally substituted aromatic polycarboxylic acid, such as a phthalate, and the Mg/Ti molar ratio is equal to or higher than 13, such as in the range of from 14-40 and from 15 to 40. Correspondingly, in certain embodiments the Mg/donor molar ratio is higher than 16, including higher than 17 and ranging from 18 to 50. In some embodiments, the donor is a diether of the general formula (I), and the Mg/Ti molar ratio is higher than 6, including higher than 7, while the Mg/donor molar ratio ranges from 9 to 20, such as from 10 to 20.

The Bi atoms may be derived from one or more Bi compounds not having Bi-carbon bonds. In some embodiments, the Bi compounds can be selected from Bi halides, Bi carbonate, Bi acetate, Bi nitrate, Bi oxide, Bi sulfate, and Bi sulfide. Compounds in which Bi has the valence of +3 may be used. Among Bi halides, Bi trichloride and Bi tribromide may be used.

The preparation of the solid catalyst component can be carried out according to several methods.

According to one of these methods, the magnesium dichloride in an anhydrous state, the titanium compound, the Bi compound and the electron donor compounds are milled together under conditions in which activation of the magnesium dichloride occurs. The product can be treated one or more times with an excess of $TiCl_4$ at a temperature between 80 and 135° C. This treatment may be followed by washings with hydrocarbon solvents until the chloride ions are removed. According to an alternative method, the product may be obtained by co-milling the magnesium chloride in an anhydrous state, and the titanium compound, the Bi compound and the electron donor compounds are treated with halogenated hydrocarbons such as 1,2-dichloroethane, chlorobenzene, dichloromethane, etc. The treatment may be carried out for 1 and 4 hours at temperature of from 40° C. to the boiling point of the halogenated hydrocarbon. Any Bi compound of the disclosure can be used in the co-milling technique, including $BiCl_3$. When using the milling technique for preparing the catalyst component, the final amount of Bi may range from 0.1 to 50% by weight.

According to another method, the solid catalyst component can be prepared by reacting a titanium compound of formula $Ti(OR)_{q-y}X_y$, where q is the valence of titanium and y is a number between 1 and q, such as $TiCl_4$, with a magnesium chloride deriving from an adduct of the general formula $MgCl_2 \cdot pROH$, where p is a number between 0.1 and 6, including from 2 to 3.5, and R is a hydrocarbon radical having 1-18 carbon atoms. The adduct can be prepared in spherical form by mixing alcohol and magnesium chloride under stirring conditions at the melting temperature of the adduct (100-130° C.). The adduct is then mixed with an inert hydrocarbon immiscible with the adduct, thereby creating an emulsion which is quickly quenched, causing the solidification of the adduct in form of spherical particles. Examples of spherical adducts prepared according to this procedure are described in U.S. Pat. Nos. 4,399,054 and 4,469,648. The resulting adduct can be directly reacted with a Ti compound or it can be subjected to thermally controlled dealcoholation (80-130° C.) to obtain an adduct in which the number of moles of alcohol is generally lower than 3, such as between 0.1 and 2.5. The reaction with the Ti compound can be carried out by suspending the adduct (optionally dealcoholated) in cold $TiCl_4$ (generally at around 0° C.); the mixture is then heated up to 80-130° C. and kept at this temperature for 0.5-2 hours. The treatment with $TiCl_4$ can be carried out one or more times. If used, the electron donor compound can be added in the desired ratios during the treatment with $TiCl_4$. In the alternative, as described in WIPO Pat. App. Pub. No. WO 2004/106388, it can be added as a fresh reactant to the solid intermediate catalyst component obtained by the above described reaction between the adduct and the Ti compound.

Several methods may be used to add one or more Bi compounds in the catalyst preparation. In one embodiment, the Bi compound(s) is/are incorporated directly into the $MgCl_2 \cdot pROH$ adduct during its preparation. In addition, the Bi compound can be added at the initial stage of adduct preparation by mixing it together with $MgCl_2$ and the alcohol. Alternatively, it can be added to the molten adduct before the emulsification step. The amount of Bi introduced may range from 0.1 to 1 mole per mole of Mg in the adduct. Bi compound(s) that may be incorporated directly into the $MgCl_2 \cdot pROH$ adduct are Bi halides such as $BiCl_3$.

The preparation of catalyst components in spherical form are described, for example, in European Patent Application EP-A-395083, and WIPO Pat. App. Pub. Nos. WO98/44009 and WO02/051544.

The solid catalyst components produced by the above referenced method may comprise a surface area (by B.E.T. method) generally between 20 and 500 m²/g, including between 50 and 400 m²/g, and a total porosity (by B.E.T. method) higher than 0.2 cm³/g, such as between 0.3 and 0.6 cm³/g. The porosity (Hg method) due to pores with radius up to 10.000 Å may range from 0.3 to 1.5 cm³/g, such as from 0.45 to 1 cm³/g.

The solid catalyst component may have an average particle size ranging from 5 to 120 µm, including from 10 to 100 µm.

As previously mentioned, in any of these preparation methods the desired electron donor compounds can be added as such or, in an alternative way, can be obtained in situ by using an appropriate precursor capable of being transformed in the desired electron donor compound by means, for example, of known chemical reactions such as etherification, alkylation, esterification, transesterification, etc.

The solid catalyst components according to the present disclosure may be converted into catalysts for the polymerization of olefins by reacting them with organoaluminum compounds according to known methods.

In some embodiments, a catalyst for the polymerization of olefins $CH_2=CHR$, in which R is a hydrocarbyl radical with 1-12 carbon atoms, optionally in mixture with ethylene, comprises the product obtained by contacting:
  (i) the solid catalyst component as disclosed above,
  (ii) an alkylaluminum compound, and
  (iii) an external electron donor compound.

The alkyl-Al compound (ii) may be chosen from trialkyl aluminum compounds such as triethylaluminum, triisobutylaluminum, tri-n-butylaluminum, tri-n-hexylaluminum, and tri-n-octylaluminum. It is also possible to use alkylaluminum halides, alkylaluminum hydrides or alkylaluminum sesquichlorides, such as $AlEt_2Cl$ and $Al_2Et_3Cl_3$, optionally in mixtures with the above referenced trialkylaluminums.

In some embodiments, the Al/Ti ratio is higher than 1 and may be between 50 and 2000. Suitable external electron-donor compounds may include silicon compounds, ethers, esters, amines, heterocyclic compounds and 2,2,6,6-tetramethylpiperidine and ketones.

Another class of external donor compounds for use in the present technology is that of silicon compounds of the general formula $(R_6)_a(R_7)_b Si(OR_8)_c$, where a and b are integers from 0 to 2, c is an integer from 1 to 4 and the sum (a+b+c) is 4; $R_6$, $R_7$, and $R_8$, are alkyl, cycloalkyl or aryl radicals with 1-18 carbon atoms optionally containing heteroatoms. In further embodiments, silicon compounds in which a is 1, b is 1, c is 2, at least one of $R_6$ and $R_7$ is selected from branched alkyl, cycloalkyl or aryl groups with 3-10 carbon atoms optionally containing heteroatoms and $R_8$ is a $C_1$-$C_{10}$ alkyl group, including methyl groups, may be used. Examples of silicon compounds for use in the present technology are methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl)thexyldimethoxysilane, (3,3,3-trifluoro-n-propyl)(2-ethylpiperidinyl)dimethoxysilane, and methyl(3,3,3-trifluoro-n-propyl)dimethoxysilane. Moreover, the silicon compounds in which a is 0, c is 3, $R_7$ is a branched alkyl or cycloalkyl group, optionally containing heteroatoms, and $R_8$ is methyl may be used. Examples of such silicon compounds for use in the present technology are cyclohexyltrimethoxysilane, t-butyltrimethoxysilane and thexyltrimethoxysilane.

The electron donor compound (iii) is used in such an amount to give a molar ratio between the organoaluminum compound and the electron donor compound (iii) of from 0.1 to 500, including from 1 to 300 and from 3 to 100.

Therefore, a further object of the present disclosure relates to a process for the (co)polymerization of olefins $CH_2=CHR$, in which R is hydrogen or a hydrocarbyl radical with 1-12 carbon atoms, carried out in the presence of a catalyst comprising the product of the reaction between:

(i) the solid catalyst component of the disclosure;

(ii) an alkylaluminum compound and, (iii) optionally an electron-donor compound (external donor).

The polymerization process can be carried out according to known techniques, for example slurry polymerization using as diluent an inert hydrocarbon solvent, or bulk polymerization using the liquid monomer (for example propylene) as a reaction medium. Moreover, it is possible to carry out the polymerization process in gas-phase operating in one or more fluidized or mechanically agitated bed reactors.

The polymerization may be carried out at temperature of from 20 to 120° C., including from 40 to 80° C. When the polymerization is carried out in gas-phase, the operating pressure may be between 0.5 and 5 MPa, such as between 1 and 4 MPa. In the bulk polymerization the operating pressure can be between 1 and 8 MPa, including between 1.5 and 5 MPa.

As previously mentioned, the catalyst of the present disclosure may show, in propylene homopolymerization, an increased activity/stereospecificity balance due to increased stereospecificity compared with catalysts prepared under the same conditions but not including Bi atoms. Moreover, a given level of polymer stereoregularity (expressed as percentage of xylene insoluble matter) may be obtained with a lower amount of internal donor with respect to the same catalyst not including Bi atoms. While not limiting the present disclosure to any particular theory, a more efficient incorporation of donor in the catalyst allows for the use of a lower amount of donor in the catalyst preparation process and a reduced generation of by-products in the reaction between the Ti compound, Mg compound and donor.

In the polymerization conditions indicated in the experimental section, the catalyst component of the disclosure is able to produce polypropylene with an isotacticity, expressed in terms of xylene insolubility, of at least 98%, such as higher than 98.5 and higher than 99%.

It has also been observed that the catalyst of the disclosure shows a particularly interesting behavior in the copolymerization of propylene with ethylene and/or other olefins of the general formula $CH_2=CHR$ for the preparation of propylene copolymers containing up to 20% weight of ethylene and/or $CH_2=CHR$ olefins different from propylene. In some embodiments, as shown in FIGS. 1 and 2 and Table 5 the catalyst components containing Bi are able to generate propylene-ethylene random copolymers which, over a wide range of ethylene amount in the polymer, are characterized by a lower amount of xylene soluble matter and a lower melting temperature with respect to the propylene-ethylene random copolymers having the same ethylene content, but generated with a catalyst not containing Bi.

When used in the homopolymerization of ethylene, the solid catalyst components containing Bi show higher activity and capability to give polymers with narrower molecular weight distribution (expressed by the lower values of melt flow ratio F/E and F/P) over the polymers obtained with the corresponding solid catalyst components not containing Bi.

The following examples are given in order to better illustrate the present technology without limiting it.

EXAMPLES

Characterizations

Determination of Mg, Ti

The determination of Mg and Ti content in the solid catalyst component has been carried out via inductively coupled plasma emission spectroscopy on "I.C.P Spectrometer ARL Accuris".

The sample was prepared by analytically weighting, in a "Fluxy" platinum crucible", 0.1-0.3 grams of catalyst and 2 grams of lithium metaborate/tetraborate in a 1/1 mixture. After addition of some drops of potassium iodide (KI) solution, the crucible is inserted in a special apparatus "Claisse Fluxy" for the complete burning. The residue is collected with a 5% v/v $HNO_3$ solution and then analyzed via ICP at the following wavelengths: magnesium: 279.08 nm; titanium: 368.52 nm.

Determination of Bi

The determination of Bi content in the solid catalyst component has been carried out via inductively coupled plasma emission spectroscopy on "I.C.P Spectrometer ARL Accuris". The sample was prepared by analytically weighting in a 200 $cm^3$ volumetric flask 0.1-0.3 grams of catalyst. After a slow addition of ca. 10 milliliters of 65% v/v $HNO_3$ solution and ca. 50 $cm^3$ of distilled water, the sample undergoes a digestion for 4-6 hours. Then the volumetric flask is diluted to the 200 $cm^3$ mark with deionized water. The resulting solution is directly analyzed via ICP at the following wavelength: bismuth: 223.06 nm.

Determination of Internal Donor Content

The determination of the content of the internal donor in the solid catalytic compound was done through gas chromatography. The solid component was dissolved in acetone, an internal standard was added, and a sample of the organic phase was analyzed in a gas chromatograph to determine the amount of donor present in the starting catalyst compound.

Determination of X.I.

2.5 g of polymer and 250 ml of o-xylene were placed in a round-bottomed flask provided with a cooler and a reflux condenser and kept under nitrogen. The resulting mixture was heated to 135° C. and kept under stirring for about 60 minutes. The final solution was allowed to cool to 25° C. under continuous stirring, and the insoluble polymer was then filtered. The filtrate was then evaporated in a nitrogen flow at 140° C. to reach a constant weight. The content of the xylene-soluble fraction is expressed as a percentage of the original 2.5 grams and then, by difference, the xylene-insolubility percentage (X.I. %).

Molecular Weight Distribution (Mw/Mn)

Molecular weights and molecular weight distributions were measured at 150° C. using a Waters Alliance GPCV/2000 instrument equipped with four mixed-bed columns PLgel Olexis having a particle size of 13 μm. The dimensions of the columns were 300×7.8 mm. The mobile phase used was vacuum distilled 1,2,4-trichlorobenzene (TCB) and the flow rate was kept at 1.0 ml/min. The sample solution was prepared by heating the sample under stirring at 150° C. in TCB for one to two hours. The concentration was 1 mg/ml. To prevent degradation, 0.1 g/l of 2,6-di-tert-butyl-p-cresol were added. 300 μl (nominal value) of solution were injected into the column set. A calibration curve was obtained using 10 polystyrene standard samples (Easi-Cal kit by Agilent) with molecular weights in a range from 580 to 7 500 000. It was assumed that the K values of the Mark-Houwink relationship were:

$K=1.21\times10^{-4}$ dl/g and $\alpha=0.706$ for the polystyrene standards, $K=1.90\times10^{-4}$ dl/g and $\alpha=0.725$ for the experimental samples.

A third-order polynomial fit was used for interpolating the experimental data and obtaining the calibration curve. Data acquisition and processing were done by using Waters Empowers 3 Chromatography Data Software with the GPC option.

Melt Flow Rate (MIL)

The melt flow rate (MIL) of the polymer was determined according to ISO 1133 (230° C., 2.16 Kg).

Determination of Melt Index (MI E, ME F, MI P)

Melt index is measured at 190° C. according to ASTM D-1238 condition "E" (load of 2.16 Kg), "P" (load of 5.0 Kg) and "F" (load of 21.6 Kg).

The ratio between MI F and MI E is indicated as F/E, while the ratio between MI F and MI P is indicated as F/P.

$^{13}$C NMR of Propylene/Ethylene Copolymers $^{13}$C NMR spectra were acquired on a Bruker AV-600 spectrometer equipped with a cryoprobe operating at 160.91 MHz in the Fourier transform mode at 120° C.

The peak of the $S_{66}$ carbon (nomenclature according to "Monomer Sequence Distribution in Ethylene-Propylene Rubber Measured by 13C NMR. 3. Use of Reaction Probability Mode" C. J. Carman, R. A. Harrington and C. E. Wilkes, Macromolecules, 1977, 10, 536) was used as an internal reference at 29.9 ppm. The samples were dissolved in 1,1,2,2-tetrachloroethane-d2 at 120° C. with an 8% w/v concentration. Each spectrum was acquired with a 90° pulse, 15 seconds of delay between pulses and CPD to remove $^{1}$H-$^{13}$C coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150) using the following equations:

$PPP=100T_{\beta\beta}/S\ PPE=100T_{\beta\delta}/S\ EPE=100T_{\delta\delta}/S$ $PEP=100S_{\beta\beta}/S\ PEE=100S_{\beta\delta}/S\ EEE=100(0.25S_{\gamma\delta}+0.5S_{\delta\delta})/S$ $S=T_{\beta\beta}+T_{\beta\delta}+T_{\delta\delta}+S_{\beta\beta}+S_{\beta\delta}+0.25S_{\gamma\delta}+0.5S_{\delta\delta}$ The molar percentage of ethylene content was evaluated using the following equation:

$E\ \%\ mol=100*[PEP+PEE+EEE]$

The weight percentage of ethylene content was evaluated using the following equation:

$$E\%\ \text{wt.} = \frac{100*E\%\ \text{mol}*MW_E}{E\%\ \text{mol}*MW_E + P\%\ \text{mol}*MW_P}$$

where P % mol is the molar percentage of propylene content, while $MW_E$ and $MW_P$ are the molecular weights of ethylene and propylene, respectively.

Melting Temperature Via Differential Scanning Calorimetry (DSC)

The melting points of the polymers (Tm) were measured by Differential Scanning calorimetry (D.S.C.) on a Perkin Elmer DSC-1 calorimeter, previously calibrated against indium melting points. The weight of the samples in every DSC crucible was kept at 6.0±0.5 mg.

In order to obtain the melting point, the weighted sample was sealed into aluminum pans and heated to 200° C. at 20° C./minute. The sample was kept at 200° C. for 2 minutes to allow a complete melting of all the crystallites, then cooled to 5° C. at 20° C./minute. After standing for 2 minutes at 5° C., the sample was heated for the second time to 200° C. at 20° C./min. In this second heating run, the peak temperature was taken as the melting temperature.

Procedure for the Preparation of the Spherical Adduct

Microspheroidal $MgCl_2 \cdot pC_2H_5OH$ adduct was prepared according to the method described in Comparative Example 5 of WIPO Pat. App. Pub. No. WO98/44009, with the difference that $BiCl_3$ in a powder form and in the amount indicated in Tables 1-6 has been added before feeding of the oil.

Procedure for the Preparation of the Phthalate-Based Solid Catalyst Component

Into a 500 ml round bottom flask, equipped with mechanical stirrer, cooler and thermometer, 300 ml of $TiCl_4$ were introduced at room temperature under nitrogen atmosphere. After cooling to 0° C., while stirring, diisobutylphthalate and 9.0 g of the spherical adduct (prepared as described above) were sequentially added into the flask. The amount of charged internal donor was such to produce a Mg/donor molar ratio of 8. The temperature was raised to 100° C. and maintained for 2 hours. Thereafter, stirring was stopped, the solid product was allowed to settle and the supernatant liquid was siphoned off at 100° C. After the supernatant was removed, additional fresh $TiCl_4$ was added to reach the initial liquid volume again. The mixture was then heated at 120° C. and kept at this temperature for 1 hour. Stirring was stopped again, the solid was allowed to settle and the supernatant liquid was siphoned off. The solid was washed with anhydrous hexane six times in a temperature gradient down to 60° C. and one time at room temperature. The resulting solid was then dried under vacuum and analyzed.

Procedure for the Preparation of the Diether-Based Solid Catalyst Component

Into a 500 ml round bottom flask, equipped with mechanical stirrer, cooler and thermometer, 300 ml of $TiCl_4$ were introduced at room temperature under nitrogen atmosphere. After cooling to 0° C., while stirring, 9,9-bis(methoxymethyl)fluorene and 9.0 g of the spherical adduct (prepared as described above) were sequentially added into the flask. The amount of charged internal donor was such as to have a Mg/donor molar ratio of 6. The temperature was raised to 100° C. and maintained for 2 hours. Thereafter, stirring was stopped, the solid product was allowed to settle and the supernatant liquid was siphoned off at 100° C. After the supernatant was removed, additional fresh $TiCl_4$ was added to reach the initial liquid volume again. The mixture was then heated at temperature in the range of 110° C. and kept at this temperature for 1 hour. Stirring was stopped again, the solid was allowed to settle and the supernatant liquid was siphoned off. The solid was washed with anhydrous hexane six times in a temperature gradient down to 60° C. and one time at room temperature. The resulting solid was then dried under vacuum and analyzed.

Procedure for the Preparation of the Succinate-Based Solid Catalyst Component

Into a 500 ml round bottom flask, equipped with mechanical stirrer, cooler and thermometer, 300 ml of $TiCl_4$ were introduced at room temperature under nitrogen atmosphere. After cooling to 0° C., while stirring, diethyl 2,3-diisopropylsuccinate and 9.0 g of the spherical adduct (prepared as described above) were sequentially added into the flask. The amount of charged internal donor was such to produce a Mg/donor molar ratio of 8. The temperature was raised to 100° C. and maintained for 2 hours. Thereafter, stirring was stopped, the solid product was allowed to settle and the supernatant liquid was siphoned off at 100° C. After the supernatant was removed, additional fresh $TiCl_4$ was added to reach the initial liquid volume again. The mixture was then heated at 120° C. and kept at this temperature for 1 hour. Stirring was stopped again, the solid was allowed to settle and the supernatant liquid was siphoned off. The solid was washed with anhydrous hexane six times in a temperature gradient down to 60° C. and one time at room temperature. The resulting solid was then dried under vacuum and analyzed.

Procedure for the Preparation of the Glutarate-Based Solid Catalyst Component

Into a 500 ml round bottom flask, equipped with mechanical stirrer, cooler and thermometer, 300 ml of $TiCl_4$ were introduced at room temperature under nitrogen atmosphere. After cooling to 0° C., while stirring, diethyl 3,3-dipropylglutarate and 12.0 g of the spherical adduct (prepared as described above) were sequentially added into the flask. The amount of charged internal donor was such to produce a Mg/donor molar ratio of 7. The temperature was raised to 120° C. and maintained for 2 hours. Thereafter, stirring was stopped, the solid product was allowed to settle and the supernatant liquid was siphoned off at 120° C. After the supernatant was removed, additional fresh $TiCl_4$ was added to reach the initial liquid volume again. The mixture was then heated at 120° C. and kept at this temperature for 1 hour. Stirring was stopped again, the solid was allowed to settle and the supernatant liquid was siphoned off. After the supernatant was removed, additional fresh $TiCl_4$ was added to reach the initial liquid volume again. The mixture was then heated at 120° C. and kept at this temperature for 0.5 hour. The solid was washed with anhydrous hexane six times in a temperature gradient down to 60° C. and one time at room temperature. The resulting solid was then dried under vacuum and analyzed.

Procedure for the Preparation of the Ethyl Benzoate-Based Solid Catalyst Component Into a 500 ml round bottom flask, equipped with mechanical stirrer, cooler and thermometer, 350 ml of $TiCl_4$ were introduced at room temperature under nitrogen atmosphere. After cooling to 0° C., while stirring, ethyl benzoate and 17.5 g of the spherical adduct (prepared as described above) were sequentially added into the flask. The amount of charged internal donor was such to meet a Mg/donor molar ratio of 1.5. The temperature was raised to 85° C. and maintained for 1 hour. Thereafter, stirring was stopped, the solid product was allowed to settle and the supernatant liquid was siphoned off at 85° C. After the supernatant was removed, additional fresh $TiCl_4$ was added to reach the initial liquid volume again. The mixture was then heated at 95° C. and kept at this temperature for 1 hour. Thereafter, stirring was stopped, the solid product was allowed to settle and the supernatant liquid was siphoned off at 95° C. After the supernatant was removed, additional fresh $TiCl_4$ was added to reach the initial liquid volume again. The mixture was then heated at 100° C. and kept at this temperature for 0.5 hour. Stirring was stopped again, the solid was allowed to settle and the supernatant liquid was siphoned off. The solid was washed with anhydrous hexane six times in a temperature gradient down to 60° C. and one time at room temperature. The resulting solid was then dried under vacuum and analyzed.

Procedure (A) for the Preparation of a Solid Catalyst Component for Ethylene Polymerization Into a 1.5 L four-necked round flask, purged with nitrogen, 800 ml of $TiCl_4$ was introduced at 0° C. Then, at the same temperature, about 40 g of the spherical adduct (prepared as described above and having the Bi/Mg molar ratio reported in Table 6) were added under stirring. The temperature was raised to 130° C. in 2 h and maintained for 60 min. Then, the stirring was discontinued, the solid product was allowed to settle and the supernatant liquid was siphoned off. A new amount of fresh $TiCl_4$ was added to the flask, such to reach the initial liquid volume. The temperature was maintained at 110° C. for 15 minutes. Again, the solid was allowed to settle, and the liquid was siphoned off. The solid was then washed two times with anhydrous iso-hexane (300 ml at each washing) at 60° C. and one at 25° C., recovered, dried under vacuum and analyzed.

Procedure (B) for the Preparation of a Solid Catalyst Component for Ethylene Polymerization Into a 0.25 L four-necked round flask, purged with nitrogen, about 9 g of the solid catalyst component (A), as prepared above, and 140 ml of dry n-heptane were introduced at 25° C. At the same temperature, under stirring, 4 ml of anhydrous THF were added dropwise.

The temperature was raised to 95° C. and the mixture was stirred for 2 hours. Then, the stirring was discontinued, the solid product was allowed to settle and the supernatant liquid was siphoned off. The solid was then washed twice with anhydrous n-heptane (2×100 ml) at 90° C., and once at 25° C., recovered, dried under vacuum and analyzed.

General Procedure for the Polymerization of Propylene

A 4 liter steel autoclave equipped with a stirrer, pressure gauge, thermometer, catalyst feeding system, monomer feeding lines and thermostating jacket, was purged with nitrogen flow at 70° C. for one hour. A suspension containing 75 ml of anhydrous hexane, 0.76 g of $AlEt_3$ (6.66 mmol), 0.33 mmol of external donor and 0.006-0.010 g of solid catalyst component, previously precontacted for 5 minutes, was charged. Either dicyclopentyldimethoxysilane (D donor) or cyclohexylmethyldimethoxysilane (C donor) were used as an external donor as specified in Tables 1-4.

The autoclave was closed and the desired amount of hydrogen was added (in particular, 2 NL in D donor tests, 1.5 NL in C donor tests and 1.25 NL in tests without external donor were used). Then, under stirring, 1.2 kg of liquid propylene was fed. The temperature was raised to 70° C. in about 10 minutes and the polymerization was carried out at this temperature for 2 hours. At the end of the polymerization, the non-reacted propylene was removed; the polymer was recovered and dried at 70° C. under vacuum for 3 hours. The resulting polymer was weighed and characterized.

The polymerization test described in Example 10 of Table 1 was carried out at 80° C. instead of 70° C.

Procedure for the Polymerization of Propylene with Ethyl Benzoate-Based Solid Catalyst Components and Para-Ethoxy Ethyl Benzoate (PEEB) as External Donor A 4 liter steel autoclave equipped with a stirrer, pressure gauge, thermometer, catalyst feeding system, monomer feeding lines and thermostatic jacket was purged with nitrogen flow at 80° C. for one hour. A suspension containing 40 ml of anhydrous hexane, 0.108 g of AlEt3 (0.95 mmol), 0.032 g of AlEt2Cl (0.26 mmol), 0.078 g (0.40 mmol) of PEEB as external donor and 0.014-0.016 g of solid catalyst component, previously precontacted for 5 minutes, was charged. The autoclave was closed and the desired amount of hydrogen (1.5 NL) was added. Then, under stirring, 1.2 kg of liquid propylene was fed. The temperature was raised to 67° C. in about 10 minutes and the polymerization was carried out at this temperature for 1 hour. At the end of the polymerization, the non-reacted propylene was removed; the polymer was recovered and dried at 70° C. under vacuum for 3 hours. Then the polymer was weighed and characterized.

Examples 1-13 and Comparative Examples C1-C2: Propylene Polymerization

The phthalate-based solid catalyst components were prepared from spherical adducts $MgCl_2 \cdot pC_2H_5OH$ using the general method described above. Their composition and related performance in relation to the propylene polymerization were carried out as described in the general procedure as indicated in Table 1.

Examples 14-18 and Comparative Examples C3-C4: Propylene Polymerization

The diether-based solid catalyst components were prepared from spherical adducts $MgCl_2 \cdot pC_2H_5OH$ using the general method described above. Their composition and related performance in relation to the propylene polymerization carried out as described in the general procedure are indicated in Table 2.

Examples 19-20 and Comparative Examples C5-C6: Propylene Polymerization

The succinate-based solid catalyst components were prepared from spherical adducts $MgCl_2 \cdot pC_2H_5OH$ using the general method described above. Their composition and related performance in relation to the propylene polymerization carried out as described in the general procedure are indicated in Table 3.

Examples 21-24 and Comparative Example C7-C8: Propylene Polymerization

The glutarate-based solid catalyst components were prepared from spherical adducts $MgCl_2 \cdot pC_2H_5OH$ using the general method described above. The solid catalyst component of Examples 21-22 was prepared using a concentration of 60 g of the spherical adduct/L of $TiCl_4$, adding the internal donor in two aliquots during the first and the second titanation steps (Mg/donor molar ratios of 21 and 10.5, respectively) and working at a temperature of 125° C. during all titanation steps. The composition of glutarate-based solid catalyst components and related propylene polymerization performance are indicated in Table 4.

Examples 25-29: Propylene/Ethylene Copolymerization

A 4 liter steel autoclave equipped with a stirrer, pressure gauge, thermometer, catalyst feeding system, monomer feeding lines and thermostatic jacket was purged with nitrogen flow at 70° C. for one hour. Then, at 30° C. under propylene flow (0.5 bar), a suspension containing 75 ml of anhydrous hexane, 0.76 g of $AlEt_3$, 3.3 mmol of cyclohexylmethyldimethoxysilane (C donor) and 0.004-0.010 g of solid catalyst component, previously precontacted for 5 minutes, was charged. The autoclave was closed and hydrogen was added (3.2 NL in D donor tests, 1.6 NL in C donor tests) to target the desired MIL, as reported in Table 5. Then, under stirring, 1.2 kg of liquid propylene together with the required amount of ethylene (4 g) was fed during the raising of temperature from 30° C. up to 70° C. in about 10-15 minutes, and the polymerization was carried out at this temperature for two hours. Ethylene was fed during the polymerization in order to keep the pressure constant. At the end of the polymerization, the non-reacted monomers were removed; the polymer was recovered and dried at 70° C. under vacuum for three hours. The polymer was then weighed and characterized. Experimental data related to propylene/ethylene copolymerizations are reported in Table 5.

Examples 30-35, C9-C10: Ethylene Polymerization

A 4 liter stainless-steel autoclave equipped with a magnetic stirrer, temperature and pressure indicator, feeding line for hexane, ethylene, and hydrogen, was purified with nitrogen at 70° C. for 60 minutes. Then, a solution of 1550 $cm^3$ of hexane containing 3.5 mmol of trialkyl aluminum (TEAL or TiBAL) was introduced at 30° C. under nitrogen flow. In a 200 $cm^3$ round bottom flask were successively introduced 50 $cm^3$ of anhydrous hexane, 0.9 mmol of trialkylaluminum and 0.020-0.030 grams of the solid catalyst component prepared according to procedure (A). After mixing 10 minutes at room temperature, the slurry was introduced under nitrogen flow into the reactor. The autoclave was closed, stirring was started and the temperature was raised to 75° C. Finally, hydrogen (4 bar partial pressure) and ethylene (7.0 bar partial pressure) were added. Polymerization was carried out at 75° C. for 120 minutes, keeping the total pressure constant by feeding ethylene. At the end the reactor was depressurized and the temperature lowered to 30° C. The recovered polymer was dried at 40° C. under vacuum and analyzed.

Examples 36-37 and Comparative Example C11: Ethylene Polymerization

The same procedure described for Examples 30-35 and C9-C10 was carried out with the following differences:

1.75 mmoles of trialkylaluminum instead of 3.5 were first introduced in the autoclave;

The hexane slurry comprising the catalyst component prepared according to the procedure (B) and aluminum trialkyl was injected into the reactor at 75° C. after its pressurization with $H_2$ (4.0 bar) and ethylene (7.0 bar) using a nitrogen overpressure

Comparative Examples C11-C16

The ethyl benzoate-based solid catalyst components were prepared from spherical adducts $MgCl_2 \cdot pC_2H_5OH$ using the general method described above. Their composition and related propylene polymerization performance are indicated in Table 6.

TABLE 1

Propylene polymerization using phthalate-based solid catalyst components

| | Support Synthesis | Support Composition | | | Solid Catalyst Component | | | | | Polymerization | | |
|---|---|---|---|---|---|---|---|---|---|---|---|---|
| | Bi/Mg % mol | Mg % wt. | Bi % wt. | EtOH/Mg m.r. | Mg % wt. | Ti % wt. | Bi % wt. | DIBP % wt. | ED type | Mileage PPtons/gTi | XI % wt. | Mw/Mn |
| Ex. 1 | 1.0 | 10.1 | 0.87 | 3.0 | 19.9 | 2.3 | 1.37 | 8.7 | D | 4.2 | 98.9 | — |
| Ex. 2 | | | | | | | | | C | 3.6 | 98.1 | — |
| Ex. 3 | 2.0 | 10.3 | 1.77 | 2.8 | 18.7 | 2.1 | 2.65 | 10.5 | D | 4.6 | 99.1 | 6.9 |
| Ex. 4 | | | | | | | | | C | 3.9 | 98.4 | 5.7 |
| Ex. 5 | 5.0 | 9.8 | 3.95 | 2.8 | 19.4 | 1.0 | 4.20 | 9.0 | D | 7.2 | 99.1 | — |
| Ex. 6 | | | | | | | | | C | 6.1 | 99.2 | — |
| Ex. 7 | 10.0 | 9.4 | 7.55 | 2.8 | 17.6 | 1.8 | 8.35 | 8.8 | D | 4.9 | 99.5 | 6.2 |
| Ex. 8 | | | | | | | | | C | 3.7 | 98.6 | 5.3 |
| Ex. 9 | 15.0 | 8.4 | 11.0 | 3.0 | 16.3 | 1.1 | 15.6 | 5.9 | D | 6.2 | 99.2 | 6.1 |
| Ex. 10 | | | | | | | | | D | 9.5 | 99.6 | — |
| Ex. 11 | | | | | | | | | C | 4.7 | 98.9 | 5.0 |
| Ex. 12 | 25.0 | 6.8 | 14.7 | 3.5 | 15.4 | 0.9 | 21.3 | 4.3 | D | 5.0 | 99.0 | — |
| Ex. 13 | | | | | | | | | C | 5.1 | 98.9 | — |
| C1 | — | 10.3 | — | 2.9 | 18.8 | 2.9 | — | 13.6 | D | 3.3 | 98.3 | 8.2 |
| C2 | | | | | | | | | C | 2.9 | 97.6 | 6.0 |

DIBP = diisobutylphthalate

TABLE 2

Propylene polymerization using diether-based solid catalyst components

| | Support Synthesis | Support Composition | | | Solid Catalyst Component | | | | | Polymerization | |
|---|---|---|---|---|---|---|---|---|---|---|---|
| | Bi/Mg % mol | Mg % wt. | Bi % wt. | EtOH/Mg m.r. | Mg % wt. | Ti % wt. | Bi % wt. | Diether % wt. | ED type | Mileage PPtons/gTi | XI % wt. |
| Ex. 14 | 1.9 | 10.8 | 1.75 | 2.6 | 15.3 | 3.8 | 2.40 | 14.9 | D | 2.8 | 98.9 |
| Ex. 15 | | | | | | | | | none | 4.0 | 97.6 |
| Ex. 16 | 3.0 | 10.1 | 2.61 | 2.9 | 15.1 | 3.6 | 3.05 | 15.9 | none | 3.0 | 97.2 |
| Ex. 17 | 10.0 | 9.4 | 7.55 | 2.8 | 14.1 | 2.4 | 10.0 | 9.8 | D | 3.6 | 98.7 |
| Ex. 18 | 15.0 | 8.4 | 11.0 | 3.0 | 13.5 | 2.2 | 13.5 | 9.7 | D | 4.1 | 98.5 |
| C3 | — | 10.2 | — | 3.0 | 14.3 | 5.5 | — | 16.4 | D | 1.6 | 98.2 |
| C4 | | | | | | | | | none | 2.6 | 96.0 |

Diether = 9,9-bis(methoxymethyl)fluorene

TABLE 3

Propylene polymerization using succinate-based solid catalyst components

| | Support Synthesis | Support Composition | | | Solid Catalyst Component | | | | | Polymerization | |
|---|---|---|---|---|---|---|---|---|---|---|---|
| | Bi/Mg % mol | Mg % wt. | Bi % wt. | EtOH/Mg m.r. | Mg % wt. | Ti % wt. | Bi % wt. | Succinate % wt. | ED type | Mileage PPtons/gTi | XI % wt. |
| Ex. 19 | 1.9 | 10.8 | 1.75 | 2.6 | 17.6 | 2.8 | 2.40 | 13.7 | D | 2.4 | 98.5 |
| Ex. 20 | | | | | | | | | C | 2.1 | 98.3 |
| C5 | — | 10.3 | — | 3.0 | 16.6 | 4.2 | — | 15.9 | D | 1.8 | 98.0 |
| C6 | | | | | | | | | C | 1.4 | 97.9 |

Succinate = diethyl 2,3-diisopropyl succinate

TABLE 4

Propylene polymerization using glutarate-based solid catalyst components

| | Support Synthesis Bi/Mg % mol | Support Composition Mg % wt. | Bi % wt. | EtOH/ Mg m.r. | Solid Catalyst Component Mg % wt. | Ti % wt. | Bi % wt. | Glutarate % wt. | Polymerization ED type | Mileage PPtons/gTi | XI % wt. |
|---|---|---|---|---|---|---|---|---|---|---|---|
| Ex. 21 | 3.5 | 11.2 | 2.6 | 2.3 | 20.4 | 1.2 | 1.30 | 8.4 | C | 3.2 | 98.7 |
| Ex. 22 | | | | | | | | | D | 4.8 | 99.1 |
| Ex. 23 | 5.0 | 9.8 | 3.95 | 2.8 | 20.5 | 1.3 | 4.10 | 7.5 | C | 3.6 | 98.1 |
| Ex. 24 | 10.0 | 9.4 | 7.55 | 2.8 | 19.6 | 0.7 | 8.27 | 6.5 | C | 3.3 | 98.3 |
| C7 | — | 3.5 | — | 2.8 | 17.2 | 3.2 | — | 17.2 | C | 1.8 | 97.6 |
| C8 | — | | | | | | | | D | 2.4 | 98.7 |

Glutarate = diethyl 3,3-dipropylglutarate

TABLE 5

Propylene-ethylene copolymerization with phthalate-based solid catalyst components

| | Support Synthesis Bi/Mg % mol | ED type | Polymerization Mileage Copotons/gTi | MIL g/10' | XS % wt. | C2 % wt. | Tm2 °C. |
|---|---|---|---|---|---|---|---|
| Ex. 25 | 2.0 | C | 4.2 | 2.7 | 3.2 | 2.6 | 146.1 |
| Ex. 26 | 5.0 | C | 9.1 | 2.7 | 5.1 | 3.4 | 141.8 |
| Ex. 27 | 10.0 | C | 6.2 | 3.2 | 4.1 | 2.9 | 142.9 |
| Ex. 28 | 15.0 | C | 10.9 | 2.7 | 4.8 | 3.3 | 142.5 |
| Ex. 29 | 25.0 | C | 9.8 | 2.8 | 6.2 | 3.9 | 135.2 |

TABLE 6

Ethyl benzoate-based solid catalyst components from spherical adducts

| | Support Synthesis Bi/Mg % mol | Support Composition Mg % wt. | Bi % wt. | EtOH/ Mg m.r. | Solid Catalyst Component Mg % wt. | Ti % wt. | Bi % wt. | EB % wt. | Polymerization ED type | Mileage tons/gTi | XI % wt. |
|---|---|---|---|---|---|---|---|---|---|---|---|
| C 11 | 3.5 | 11.2 | 2.6 | 2.3 | 18.4 | 2.2 | 3.00 | 9.1 | PEEB | 1.2 | 92.9 |
| C 12 | | | | | | | | | C | 1.2 | 92.4 |
| C 13 | | | | | | | | | D | 1.65 | 94.0 |
| C 14 | — | 13.0 | — | 1.9 | 18.6 | 3.1 | — | 8.0 | PEEB | 0.8 | 95.5 |
| C 15 | | | | | | | | | C | 1.2 | 94.8 |
| C 16 | | | | | | | | | D | 1.45 | 95.6 |

EB = ethyl benzoate

TABLE 6

Ethylene polymerization using solid catalyst components prepared according to procedure (A) and (B)

| | Support Type Bi/Mg % mol | Support Composition Mg % wt. | Bi % wt. | EtOH/ Mg m.r. | Solid Catalyst Component Mg % wt. | Ti % wt. | Bi % wt. | THF % wt. | AlR3 type | Polymerization Mileage PEKg/gTi | MI E g/10' | F/E | F/P |
|---|---|---|---|---|---|---|---|---|---|---|---|---|---|
| Ex. 30 | 4.4 | 9.7 | 3.7 | 2.9 | 16.6 | 5.3 | 5.1 | — | TiBAL | 490 | 0.77 | 49.4 | 12.7 |
| Ex. 31 | | | | | | | | | TEAL | 250 | 0.18 | 45.3 | 12.0 |
| Ex. 32 | 10.1 | 9.0 | 7.8 | 2.9 | 16.4 | 3.3 | 11.4 | — | TiBAL | 400 | 0.72 | 47.2 | 13.1 |
| Ex. 33 | | | | | | | | | TEAL | 240 | 0.82 | 40.2 | 12.8 |
| Ex. 34 | 25.1 | 6.8 | 14.7 | 3.5 | 13.7 | 2.1 | 17.4 | — | TiBAL | 340 | 0.92 | 37.8 | 13.1 |
| Ex. 35 | | | | | | | | | TEAL | 310 | 0.50 | 39.6 | 12.4 |
| C9 | — | 10.6 | — | 2.8 | 15.6 | 9.0 | — | — | TiBAL | 300 | 0.62 | 55.9 | 15.9 |
| C10 | | | | | | | | | TEAL | 190 | 0.21 | 44.7 | 13.0 |
| Ex. 36 | 10.1 | 9.0 | 7.8 | 2.9 | 12.8 | 0.9 | 8.7 | 28.18 | TEAL | 300 | 0.70 | 29.6 | 9.8 |

TABLE 6-continued

Ethylene polymerization using solid catalyst components prepared according to procedure (A) and (B)

| | Support Type | Support Composition | | EtOH/ | Solid Catalyst Component | | | | | Polymerization Mileage | | | |
|---|---|---|---|---|---|---|---|---|---|---|---|---|---|
| | Bi/Mg % mol | Mg % wt. | Bi % wt. | Mg m.r. | Mg % wt. | Ti % wt. | Bi % wt. | THF % wt. | AlR3 type | PEKg/ gTi | MI E g/10' | F/E | F/P |
| Ex. 37 | 25.1 | 6.8 | 14.7 | 3.5 | 10.3 | 0.8 | 18.5 | 23.5 | TEAL | 290 | 0.49 | 30.2 | 10.1 |
| C11 | — | 10.6 | — | 2.8 | 13.8 | 4.3 | — | 25 | TEAL | 190 | 1.42 | 32.4 | 11.2 |

What is claimed is:

1. A solid catalyst component for the (co)polymerization of olefins $CH_2=CHR^x$, in which $R^x$ is hydrogen or a hydrocarbyl radical with 1-12 carbon atoms, comprising Ti, Mg, and Cl, an electron donor compound selected from the group consisting of carbamates, ketones, esters of malonic acids, esters of glutaric acids, esters of maleic acids, esters of succinic acids, alkyl and aryl esters of optionally substituted aromatic polycarboxylic acids, diol derivatives chosen among monoesters monocarbamates and monoesters monocarbonates, and 1,3-diethers of general formula

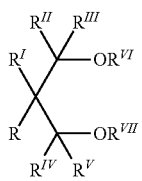

(I)

wherein R, $R^I$, $R^{II}$, $R^{III}$, $R^{IV}$ and $R^V$, equal or different to each other, are hydrogen or hydrocarbon radicals having from 1 to 18 carbon atoms, and $R^{VI}$ and $R^{VII}$, equal or different from each other, have the same meaning of R-$R^V$ except that they cannot be hydrogen; and one or more of the R-$R^{VII}$ groups can be linked to form a cycle, or mixtures thereof, and from 0.1 to 50% by weight of bismuth (Bi) with respect to the total weight of the solid catalyst component.

2. The solid catalyst component of claim 1, in which the amount of Bi ranges from 0.5 to 40% by weight.

3. The solid catalyst component of claim 2, in which the amount of Bi ranges from 0.5 to 20% by weight.

4. The solid catalyst component of claim 3, in which the amount of Bi ranges from 1 to 20% by weight.

5. The solid catalyst component of claim 1, in which the Bi atoms are derived from one or more Bi halide compounds.

6. The solid catalyst component of claim 1, wherein the solid catalyst component contains 0.5 to 40 wt. % of the electron donor, wherein the solid catalyst component has a Mg/Ti ratio from 13 to 40, and wherein the solid catalyst component has a Mg/electron donor ratio from 16 to 50.

7. The catalyst component according to claim 5, in which the electron donor is selected from alkyl and aryl esters of optionally substituted aromatic polycarboxylic acids, the Mg/Ti molar ratio is equal to or higher than 13, and the Mg/donor ratio is higher than 16.

8. The catalyst component according to claim 5, in which the electron donor is selected from diethers of the general formula (I), the Mg/Ti molar ratio is higher than 6 and the Mg/donor ratio ranges from 9 to 20.

9. A catalyst for the (co)polymerization of olefins $CH_2=CHR^x$, in which $R^x$ is hydrogen or a hydrocarbyl radical with 1-12 carbon atoms, comprising the product obtained by contacting:
(i) the solid catalyst component according to claim 1;
(ii) an alkylaluminum compound and,
(iii) optionally an external electron donor compound.

10. The catalyst according to claim 9, in which the alkyl-Al compound (ii) comprises one or more trialkyl aluminum compounds.

11. The catalyst according to claim 9, in which the external donor compound is selected from the group consisting of silicon compounds of the formula $(R_6)_a(R_7)_bSi(OR_8)_c$, where a and b are integers from 0 to 2, c is an integer from 1 to 4 and the sum (a+b+c) is 4; and $R_6$, $R_7$, and $R_8$, are alkyl, cycloalkyl or aryl radicals with 1-18 carbon atoms optionally containing heteroatoms.

12. A process for the (co)polymerization of olefins $CH_2=CHR^x$, in which $R^x$ is hydrogen or a hydrocarbyl radical with 1-12 carbon atoms, carried out in the presence of the catalyst according to claim 9.

13. The process according to claim 12, in which propylene and ethylene and/or other olefins $CH_2=CHR^x$ are copolymerized to produce propylene copolymers containing up to 20% weight of ethylene and/or $CH_2=CHR^x$ olefins different from propylene.

14. A process for the preparation of the catalyst components according to claim 1, comprising reacting a titanium compound of formula $Ti(OR)_{q-y}X_y$, where q is the valence of titanium and y is a number between 1 and q, with a magnesium chloride deriving from an adduct of formula $MgCl_2 \cdot pR''OH$, where p is a number between 0.1 and 6, and $R''$ is a hydrocarbon radical having 1-18 carbon atoms, the process being characterized by the fact that the adduct contains Bi atoms in an amount ranging from 0.1 to 1 mole per mole of Mg.

15. A Lewis base adduct comprising $MgCl_2$, an alcohol $R'''OH$ in which $R'''$ is a $C_1$-$C_{10}$ hydrocarbon group, present in a molar ratio with $MgCl_2$ ranging from 0.1 to 6 and one or more Bi compounds in an amount such that the Bi atoms range from 0.1 to 1 mole per mole of Mg.

* * * * *